United States Patent [19]

Könneker

[11] Patent Number: 4,550,698

[45] Date of Patent: Nov. 5, 1985

[54] INTERNAL COMBUSTION ENGINE MOUNT

[75] Inventor: Reinhard Könneker, Monsheim, Fed. Rep. of Germany

[73] Assignee: Harley-Davidson Motor Co., Inc., Milwaukee, Wis.

[21] Appl. No.: 630,699

[22] Filed: Jul. 13, 1984

[30] Foreign Application Priority Data

Jul. 21, 1983 [DE] Fed. Rep. of Germany ....... 3326321

[51] Int. Cl.⁴ .............................................. F02F 7/00
[52] U.S. Cl. ......................... 123/195 AC; 123/198 E; 180/228
[58] Field of Search ............... 180/219, 312, 228, 291, 180/297; 123/55 VF, 195 R, 195 AC, 195 H, 195 S, 198 E

[56] References Cited

U.S. PATENT DOCUMENTS

| | | | |
|---|---|---|---|
| 2,758,581 | 8/1956 | Flatz et al. | 123/41.69 |
| 3,200,804 | 8/1965 | Hensler et al. | 123/195 R |
| 3,542,146 | 11/1970 | Hooper | 180/228 |
| 3,722,612 | 3/1973 | Issigonis et al. | 180/228 |
| 3,811,528 | 5/1974 | Hooper | 180/228 |
| 4,066,142 | 1/1978 | Hooper | 180/228 |
| 4,323,135 | 4/1982 | Tominaga et al. | 180/228 |
| 4,412,597 | 11/1983 | Aiba | 180/228 |
| 4,427,087 | 1/1984 | Inoue et al. | 180/219 |
| 4,480,368 | 11/1984 | Vachon | 123/41.84 |

FOREIGN PATENT DOCUMENTS 91068 7/1922 Fed. Rep. of Germany.

OTHER PUBLICATIONS

"Motorrad Technik" by Helmut Hütten, Oct. 1983, pp. 297–313.
"Kenndaten und Konstruktion Neuzeitlicher Zweiradmotoren" by Franz Laimbook, 1982.

Primary Examiner—Craig R. Feinberg
Assistant Examiner—David A. Okonsky

[57] ABSTRACT

The cylinder head and crankcase housing of an internal combustion engine cooperate with a frame, particularly a motorcycle underframe, to form a supporting unit. The internal combustion engine is secured to the underframe by holding members which cooperate with both the cylinder head and the crankcase housing. The cylinder head is disposed in a median plane of the cylinder and a support core is provided inside the cylinder head. This core is used as the point of attachment tie of the cylinder head. The support core is also continued in the crankcase housing. The support core and attachment tie are connected to one another by the interposition of bolts to provide an advantageous rigid engine mounting system.

9 Claims, 3 Drawing Figures

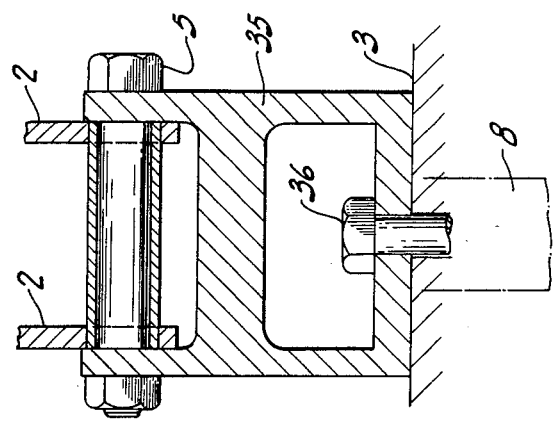
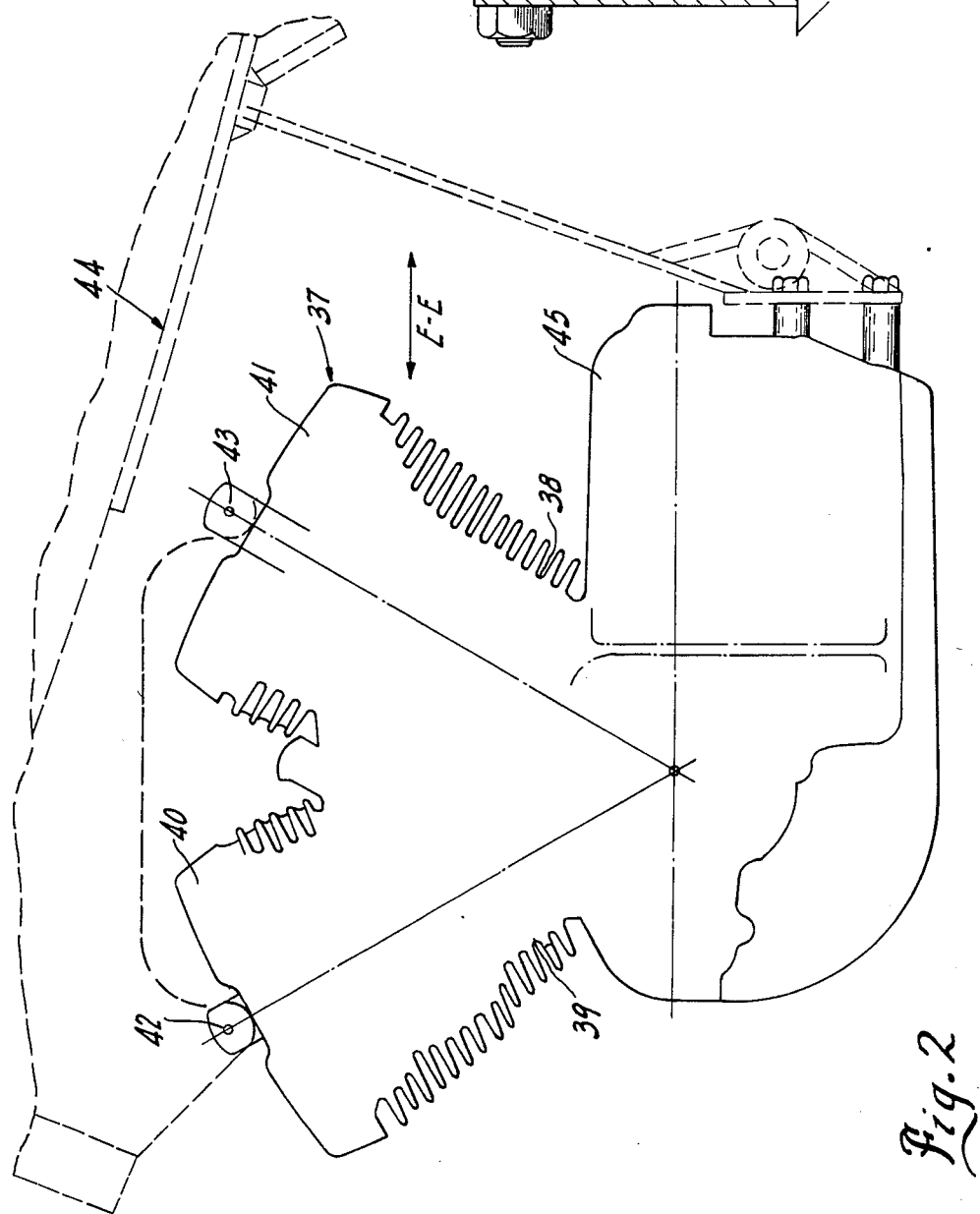

INTERNAL COMBUSTION ENGINE MOUNT

BACKGROUND OF THE INVENTION

1. Field of the Invention

The present invention relates generally to the mounting of internal combustion engines to a frame and more particularly in the preferred embodiment to the mounting of internal combustion engines to motorcycle underframes. Still more particularly, the invention relates to the use of holding members cooperating with both the cylinder head and the crankcase housing attached to the underframe.

2. Description of the Prior Art

One known type of internal combustion engine mount is shown in German Auslegeschrift (published specification) No. 1,064,832. The holding member for this engine comprises a lug directed laterally away from the cylinder head. This design has the disadvantage in that the stresses arising in the cylinder head and crankcase housing are not introduced in an optimum manner by the lug. Rather, the stresses cause moments of force which can lead to breakage of the lug. In addition, there are no reinforcing arrangements provided on the crankcase housing. Because of this failure, the supporting assembly, comprising the internal combustion engine and the underframe, does not have sufficient rigidity.

OBJECTS AND SUMMARY OF THE INVENTION

It is a primary object of the present invention to provide connections between the cylinder head and the crankshaft housing of an internal combustion engine and the frame therefor which promotes proper absorption of the stresses which occur.

Another object of the present invention is to provide an internal combustion engine-frame coupling system which eliminates distortion from the support unit formed by an underframe and internal combustion engine.

How these and other objects of the invention are accomplished will be described in the following description of the preferred embodiment, taken in conjunction with the drawings. Generally, however, they are accomplished by providing support cores on the cylinder head of the engine. The arrangement of holder members, the design of the support cores, the attachment connection on the crankcase housing, and the connection of the respective components lead to a proper introduction into the engine of the forces which occur. The objects are further accomplished by forming a rigid unit of the engine and underframe by reinforcing the upper and lower parts of the crankcase housing with walls. A sleeve-like cast iron section is provided for the bores and is easily integrated into the cylinder head. Because of the reduction in height and the consequent reduction in the length and weight of the connection bolts, the engine is improved by reduced weight. Moreover, in the preferred embodiment, the internal combustion engine includes two U-shaped cylinders disposed in the longitudinal direction to a motorcycle underframe. Both heads are provided with support cores and each is attached to the underframe by a holding member. A particularly rigid support system is formed by this arrangement of the underframe and the internal combustion engine.

DESCRIPTION OF THE DRAWINGS

FIG. 2 is a side elevation of an alternate embodiment of an internal combustion engine according to the present invention; and FIG. 3 is a section on an enlarged scale along the line III—III of FIG. 1.

DESCRIPTION OF THE PREFERRED EMBODIMENT

Figure 1:
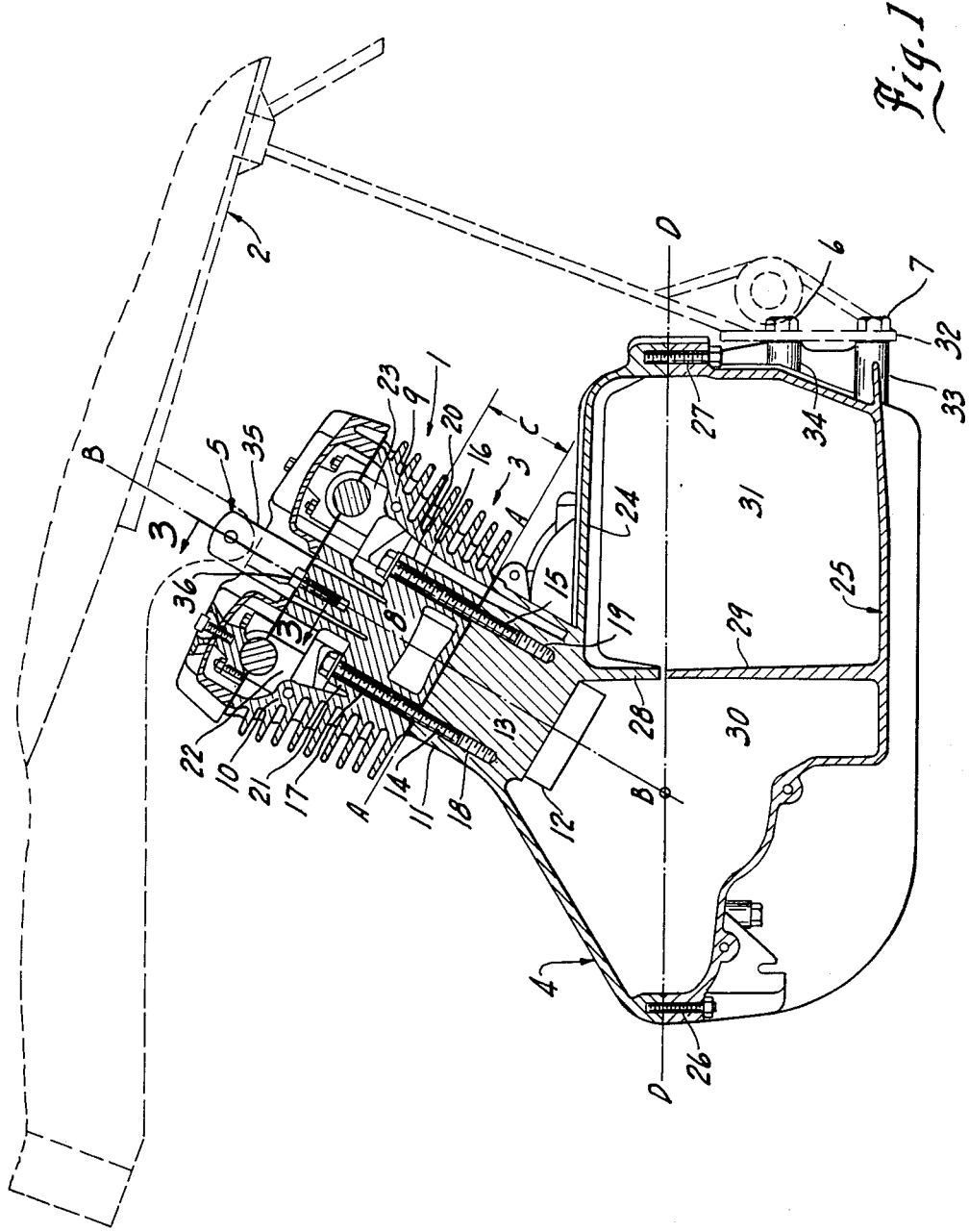
FIG. 1 is a cross-section through an internal combustion engine according to the present invention.

An internal combustion engine 1 according to FIG. 1 is secured to a motorcycle underframe 2, and together they form a supporting unit. The internal combustion engine 1 comprises a cylinder head 3 and a crankcase housing 4. The cylinder head 3 and the crankcase housing 4 are joined along a plane A—A and are secured to the underframe 2 by means of holding members 5, 6 and 7.

The holding member 5 is attached to the cylinder head 3 and is disposed in a median plane B—B of the cylinder and is joined to a support core 8 provided inside the cylinder head 3. The support core 8 is a component part of the cylinder head 3 and is supported between the outer walls 9 and 10 of the cylinder head 3.

In one area 11 of the crankcase housing 4, in which the cylinder 12 also extends, the support core 8 is continued as an attachment tie 13. The support core 8 and the attachment tie 13 and, respectively, the cylinder head 3 and the crankcase housing 4 are connected together by means of bolts 14, 15. For this purpose, the support core 8 includes bores 16 and 17 and the attachment tie includes threaded bores 18 and 19.

The bores 16 and 17 are provided in sleeve-like cast-iron sections 20 and 21, which extend symmetrically to the median plane B—B of the cylinder, but which extend over a partial area C of the total height of the cylinder head 3. For the bolts 14 and 15 to be accessible, recesses 22 and 23 are provided in the support core 8.

The crankcase housing 4 is formed by an upper part 24 which contains the cylinder 12, and a lower part 25. The parts are in the form of half-shells and are joined in a horizontal plane D—D and are connected by bolts 26 and 27. Wall 28 extending downwardly from lower part 24 and wall 29 extending upwardly in lower part 25 extend in a common vertical plane and act on the one hand as a reinforcement. On the other hand, these walls separate a crankshaft chamber 30 (x is the center of the crankshaft) and a transmission chamber 31 provided inside the crankcase housing. The lower part 25 is continued up to a vertical fastening portion 32 of the underframe 2, where it is held in position with the interposition of holding members 6 and 7 (bolts) screwed into lugs 33 and 34.

The holding member 5 of the cylinder head 3 is likewise a bolt (FIG. 3). However, a connection element 35, which is connected to the cylinder head 3 by means of a bolt 36, is provided between the holding member 5 and the cylinder head 3. Whether use is made of only one holding member 5 and one connection element 35 or whether use is made of a plurality of holding members, the purpose of holding the cylinder head 3 is largely determined by structural considerations, e.g. whether a one-cylinder or a two-cylinder engine is being connected to the underframe.

An internal combustion engine 37 according to an alternate embodiment of the invention is illustrated in FIG. 2 and comprises cylinders 38 and 39 arranged in a V-formation. The cylinders 38 and 39 are oriented in the longitudinal direction E—E of the motorcycle underframe 44. In this internal combustion engine, both the cylinder heads 40 and 41 are secured at the same height to the motorcycle underframe 44 by means of holding members 42 and 43, and the cylinder heads 40 and 41 are provided with support cores which correspond to the support core 8 and the other features already described in this connection. The crankcase housing 45 is secured to the motorcycle underframe as described in FIG. 1.

While the present invention has been described by reference to a preferred and an alternate embodiment, the invention is not to be limited thereby but is to be limited solely by the claims which follow.

I claim:

1. An internal combustion engine, which together with a motorcycle underframe forms a supporting unit, said engine comprising a cylinder head having axially extending wall portions and a crankcase housing, a support core comprising a first body extending between the wall portions of said cylinder head and being integral with and disposed within said cylinder head, holding members for securing the internal combustion engine to the motorcycle underframe, one of said holding members being coupled to the cylinder head and another to the crankcase housing of said engine, said holding member attached to the cylinder head being disposed in a median plane of the cylinder head and joined to the support core provided inside the cylinder head, an attachment tie comprising a second body disposed within and integral with the crankcase housing, said second body being in abutment with and forming a continuation of the first body forming said support core, said support core and said attachment tie being connected to one another by bolts to provide a continuous body extending between said cylinder head and said crankcase for supporting said one of said holding members.

2. The invention set forth in claim 1 wherein the holding members used to couple the crankcase housing to said underframe are attached to a lower part of said crankcase housing.

3. The invention set forth in claim 1 wherein said internal combustion engine comprises at least two cylinders which are arranged in a V-formation and which are orientated in the longitudinal direction of the motorcycle underframe and wherein the cylinder heads of each cylinder include said support cores and are secured at approximately the same height to the motorcycle underframe by means of said holding members.

4. The invention set forth in claim 1 wherein said crankcase housing includes an upper part containing at least one cylinder and a lower part, said upper and said lower parts being joined along a horizontal plane and each of said upper and lower parts including reinforcing walls extending inside the crankcase housing.

5. The invention set forth in claim 4 wherein said reinforcing walls of the upper part and of the lower part extend in a vertical plane and divide the crankcase housing into a crankshaft chamber and a transmission chamber.

6. The invention set forth in claim 1 wherein said support core comprises bores for the bolts used to couple said support core to said attachment tie, said bores extending symmetrically to the median plane of the cylinders of said engine and said bores being provided in a cast-iron, sleeve-like section of said support core.

7. The invention set forth in claim 6 wherein said cast-iron sections extend for only a portion of the total height of the cylinder head.

8. The invention set forth in claim 1 wherein a connection element is provided between said support core and the holding member used for said cylinder head coupling.

9. The invention set forth in claim 8 wherein said connection element is secured to the cylinder head by means of one or more bolts.

* * * * *